United States Patent [19]

Oiler

[11] 3,981,067

[45] Sept. 21, 1976

[54] METHOD OF SPLICING AND PRODUCTS THEREOF

[75] Inventor: Philip R. Oiler, La Crescenta, Calif.

[73] Assignee: Hehr International Inc., Los Angeles, Calif.

[22] Filed: Feb. 18, 1975

[21] Appl. No.: 550,735

[52] U.S. Cl. .................... 29/522; 52/656; 52/758 H

[51] Int. Cl.$^2$ .................... F16B 7/00; E04C 2/38

[58] Field of Search .................... 52/656, 758 H, 726, 52/522, 741; 29/522, 526

[56] References Cited

UNITED STATES PATENTS

| | | | |
|---|---|---|---|
| 898,751 | 9/1908 | Krantz | 52/758 H |
| 1,996,109 | 4/1935 | Hiering | 52/758 H |
| 2,570,169 | 10/1951 | Verhagen | 52/656 |
| 2,804,954 | 9/1957 | Gillespie | 52/758 H |
| 3,035,672 | 5/1962 | Tuten et al. | 52/726 |
| 3,200,913 | 8/1965 | Nelson | 52/656 |
| 3,555,736 | 1/1971 | Koch et al. | 52/208 |
| 3,622,186 | 11/1971 | Newell et al. | 52/758 H |
| 3,757,479 | 9/1973 | Martinez | 52/656 |

FOREIGN PATENTS OR APPLICATIONS

| | | | |
|---|---|---|---|
| 227,509 | 5/1963 | Austria | 29/522 |

*Primary Examiner*—Ernest R. Purser
*Assistant Examiner*—James L. Ridgill, Jr.
*Attorney, Agent, or Firm*—Reed C. Lawlor

[57] ABSTRACT

A method and products produced thereby, namely, the method of splicing together two abutting channeled members by inserting a bent plate of suitable size and shape across the joint line in the common channel of the abutted members and flattening the plate in the channel so that the plate edges are forced into pressure engagement with the walls of the channel thereby rigidly connecting the two members to the plate and to each other. By this method a unitary extruded metal rectangular frame for slidable window assemblies may be produced.

4 Claims, 9 Drawing Figures

FIG. 1.
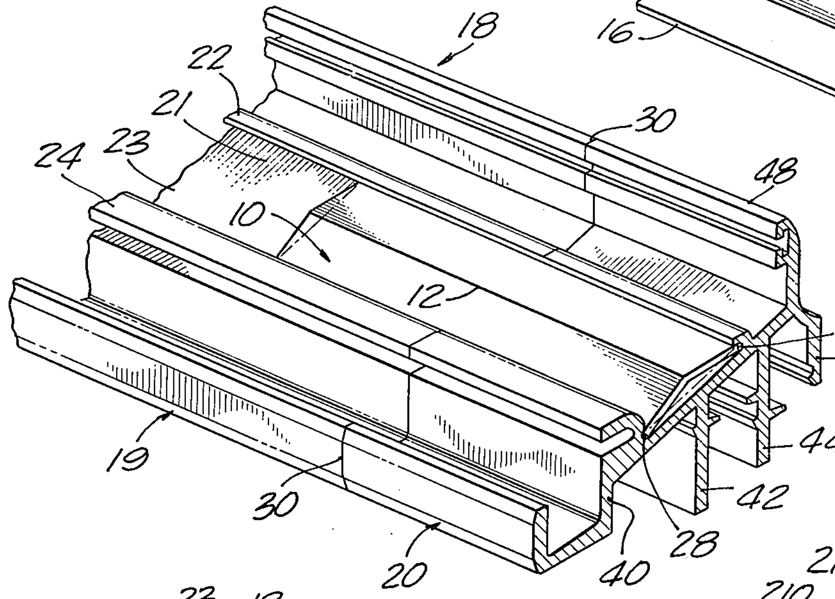
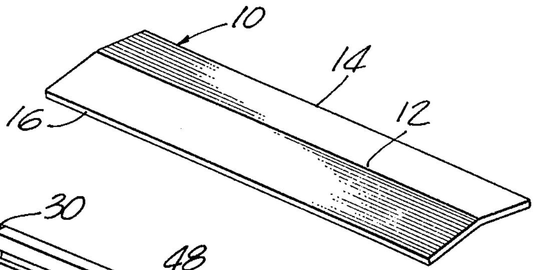
FIG. 2.
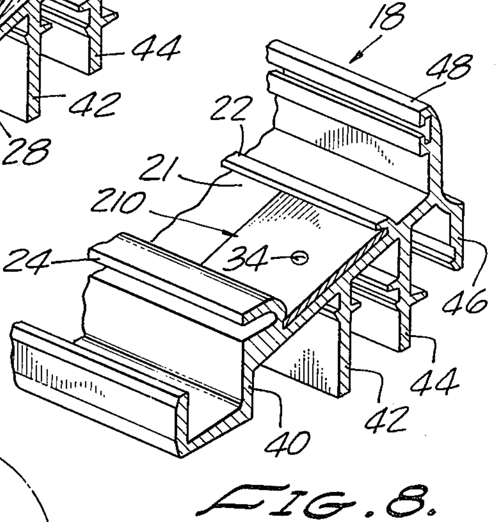
FIG. 8.
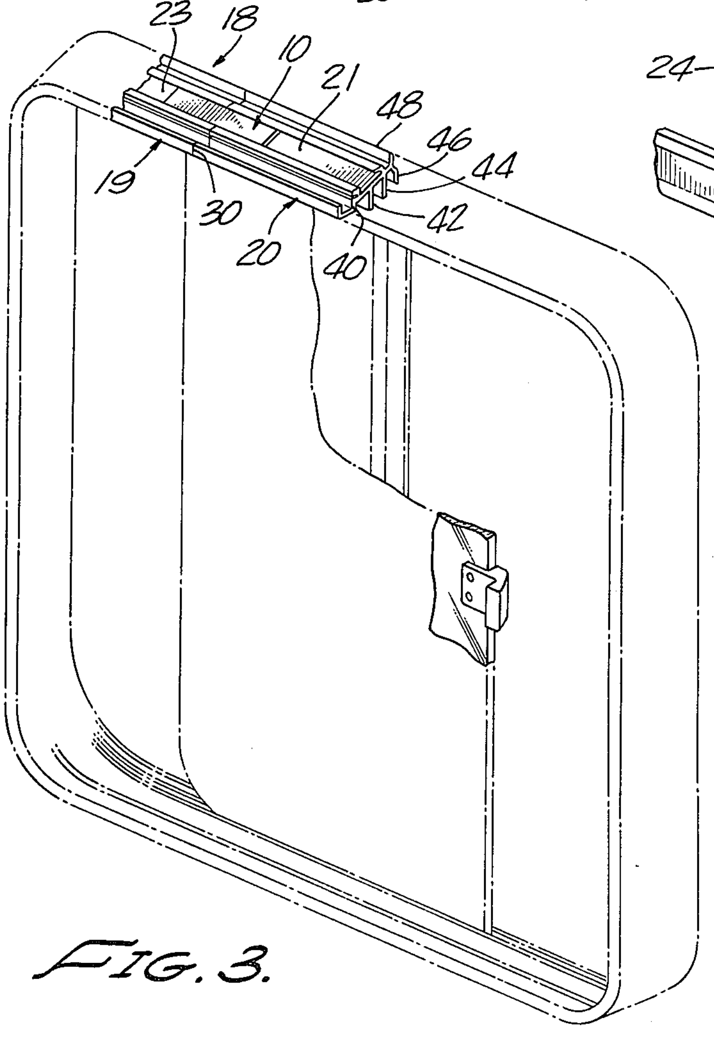
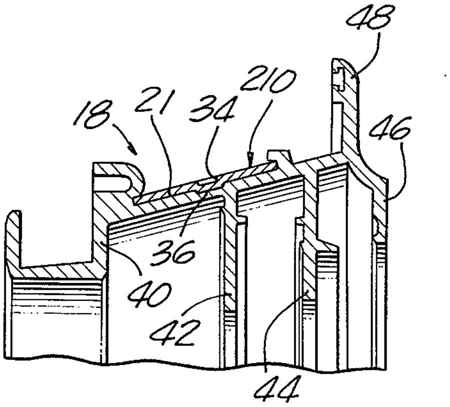
FIG. 9.
FIG. 3.

METHOD OF SPLICING AND PRODUCTS THEREOF

CROSS REFERENCES TO RELATED APPLICATIONS

U.S. patent application Ser. No. 558,798, filed Mar. 17, 1975.

This invention relates generally to methods of splicing together two or more elongated sections of rigid material. Such methods are particularly useful for fabricating frames of structural closure members, such as windows, doors, and the like, wherein such frames have a circumambient shape, such as rectangular.

The method of this invention is also useful for splicing together two or more sections of elongated extruded metal, each such section having an elongated uniform channel of approximately identical dimensions.

The method disclosed herein is paticularly suited to the fabrication of a closure member frame which is in the form of an elongated section of material, such as extruded aluminum and which is folded in a circumambient manner so that its ends abut each other at a unitary joint line and are rigidly secured together by a splice plate as herein described.

Many methods for splicing together two or more sections of elongated material, are well known in the art. By way of example, such well known methods include the step of welding the butt joint between the sections; the use of a joining bar which is riveted to the respective sections; the use of a bar across the butt joint which is welded to the respective sections: the overlapping of the respective sections which are then riveted or screwed directly to one another. The method of the invention herein described is superior to the prior art methods because it does not require welding, riveting, screwing, or drilling of holes, and the like and is therefore easier to perform and less costly in time, labor, and material.

It is therefore an object of this invention to provide a method for splicing which requires no riveting, welding, gluing, screwing, or hole-drilling and the like.

It is a further object of this invention to provide a method of splicing which, although simple and expedient, provides a rigid securing means.

It is still a further object of this invention to provide a method of splicing which is particularly well adapted for fabricating the frames of windows, doors, vents and the like.

It is still a further object of this invention to provide a method of splicing particularly adapted to the fabrication of frames of windows, doors, vents and the like, which frames comprise an elongated unitary section of extruded metal having at least one elongated channel of uniform cross-section.

The foregoing objects and various additional objects, features, and advantages will be set forth hereinafter in sufficient detail as to enable a person in the art to practice the invention. The invention is described in connection with the drawings wherein:

FIG. 1 is a fragmentary perspective view of a window frame and splice plate illustrating a product at various stages of fabrication by the method of this invention;

FIG. 2 is a perspective view of a bent splice plate utilized in the process of this invention;

FIG. 3 is an isometric view of a completed window frame of a unitary section of extruded metal embodying this invention;

FIGS. 7–9 illustrate additional features which increase the rigidity of the splice formed by the process of this invention.

Figure 4:
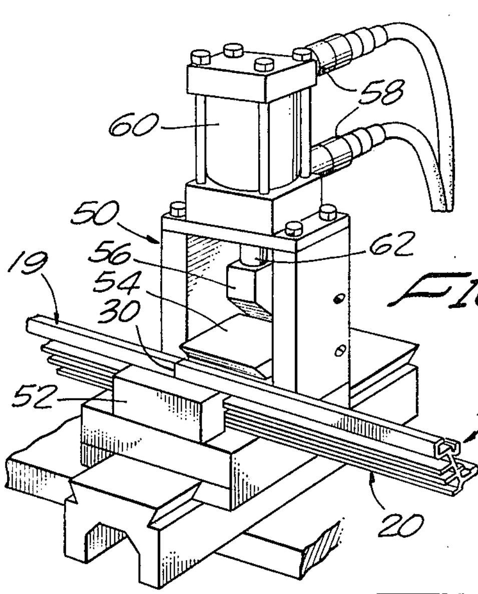
FIGS. 4–6 are various views of a hydraulic machine which may be utilized to perform certain steps of this invention.

In FIG. 1 there is shown a cut-away portion of two sections 19 and 20 of an extruded metal frame 18. The sections have identical cross-sections and are joined at a butt joint 30. Frames of this type, when used in window assemblies, may have a series of flanges for a variety of purposes. For example, in the frame of FIG. 1, flanges 40, 42, 44, and 46 are used to provide a plurality of glazing channels which receive a plurality of panels including fixed and stationary glass panels, screen panels, storm panels, and the like. Panels of that type are indicated in phantom in FIG. 3. Flange 48, on the other hand, serves the purpose of providing a circumferential overlap covering the exterior surface of the wall adjacent the aperture in which the window assembly is installed.

There are, however, at least two flanges such as flanges 22 and 24 which are pertinent to the invention herein described since they form continuous channel 21 which is utilized in this invention.

As illustrated in FIG. 1, channel 21 receives splice plate 10. Splice plate 10 is best illustrated in FIG. 2 in which it is indicated to be a rectangular plate having elongated spaced apart parallel edges 14 and 16 and is shown to be sent into a dihedral configuration along bend axis 12, which is parallel to edges 14 and 16. In the performance of the method herein described, splice plate 10, in its bent or dihedral configuration, is inserted in channel 21 so that elongated edges 14 and 16 rest against floor 23 of the channel immediately adjacent flanges 22 and 24 respectively, and across butt joint 30 so that approximately half of the splice plate rests within the channel of section 19 and the other half rests within the channel of section 20.

As illustrated in FIG. 1, flanges 22 and 24, which form the walls of channel 21, may be shaped to provide grooves at their junctions with the floor of the channel for receiving the elongated edges of the splice plate. Plate grooves 26 and 28 are such receiving grooves in the frame illustrated in FIG. 1. When these grooves are provided, it may be desirable in some cases to slide the splice plate into the respective channels of the sections prior to the step of abutting the sections. Grooves, such as plate grooves 26 and 28, provide the advantages of inherent alignment of the frame sections prior to their permanent splicing and of providing a diminished degree of frictional engagement to facilitate joining the sections during the splicing process. These advantages would also be realized with the flanges or channel walls inclined toward each other to be further apart along the channel floor.

As illustrated by phantom lines in FIG. 1, after the bent splice plate is inserted in channel 21 of frame 18, pressure is applied against the splice plate in a direction perpendicular to the plane of the floor of the channel thereby causing the splice plate to become flat. As a result of this flattening, the distance between parallel elongated edges 14 and 16 increases, forcing the plate edges into engagement with the walls of channel 21. In some cases the plate edges will indent and deform the walls of the grooves. In the actual practice of this invention, it has been found advantageous to apply the splicing method to an extruded aluminum frame using a splice plate made of aluminum. Aluminum is light, rust resistant, easily worked and readily available. It has been found advantageous to provide a flat splice plate having a width which is in the range of 0.005 inches to 0.010 inches greater than the width of channel 21. It has also been found advantageous to bend the splice plate for insertion into the channel by reducing the plate width so that it is in the range of approximately 0.005 inches to 0.010 inches less than the width of channel 21.

Where grooves, such as plate grooves 26 and 28 are provided, the channel width referred to above includes the added depth of the grooves.

The steps of bending a flat plate prior to inserting it in the channel of the elongated member and of flattening the plate in the channel of the elongated member, may be accomplished either manually or with the aid of one or more machines. The first of those two steps might be accomplished manually, for example, by placing the splice plate in the jaws of a vise so that parallel edges 14 and 16 respectively are jammed against the opposing faces of the vise jaws. Contraction of the vise jaws will then produce a bending of the splice plate along a longitudinal bend axis.

If the ranges of differences in the dimensions of the channel and splice plate referred to above are utilized, the total bending angle required is that which will produce a decrease in the distance between the elongated parallel edges in the range of 0.010 inches to 0.020 inches. After the bent splice plate is inserted in the channels of the elongated sections to be joined, the plate may be flattened by placing an elongated block of suitable material, having a width slightly less than the width of channel 21, above the bend axis 12 of splice plate 10 and then hammering the block down onto the splice plate thereby flattening the plate within the channel. Alternatively, suitable support blocks may be placed on opposing sides of the frame to preclude damage to other flanges and then the frame with splice plate and hammering blocks can be inserted in the jaws of a vise. Contracting the vise jaws will then cause the block to press against the bend axis of the splice plate thereby flattening the plate.

Whether accomplished by manual means or by means of a machine, such as the machine described below, the purpose of the step in which the bent splice plate is compressed within the frame channel is to cause the plate to expand to force its edges further apart and into outwardly directed pressure engagement with the channel walls so that the sections or ends to be joined are rigidly secured to the splice plate.

Figure 5:
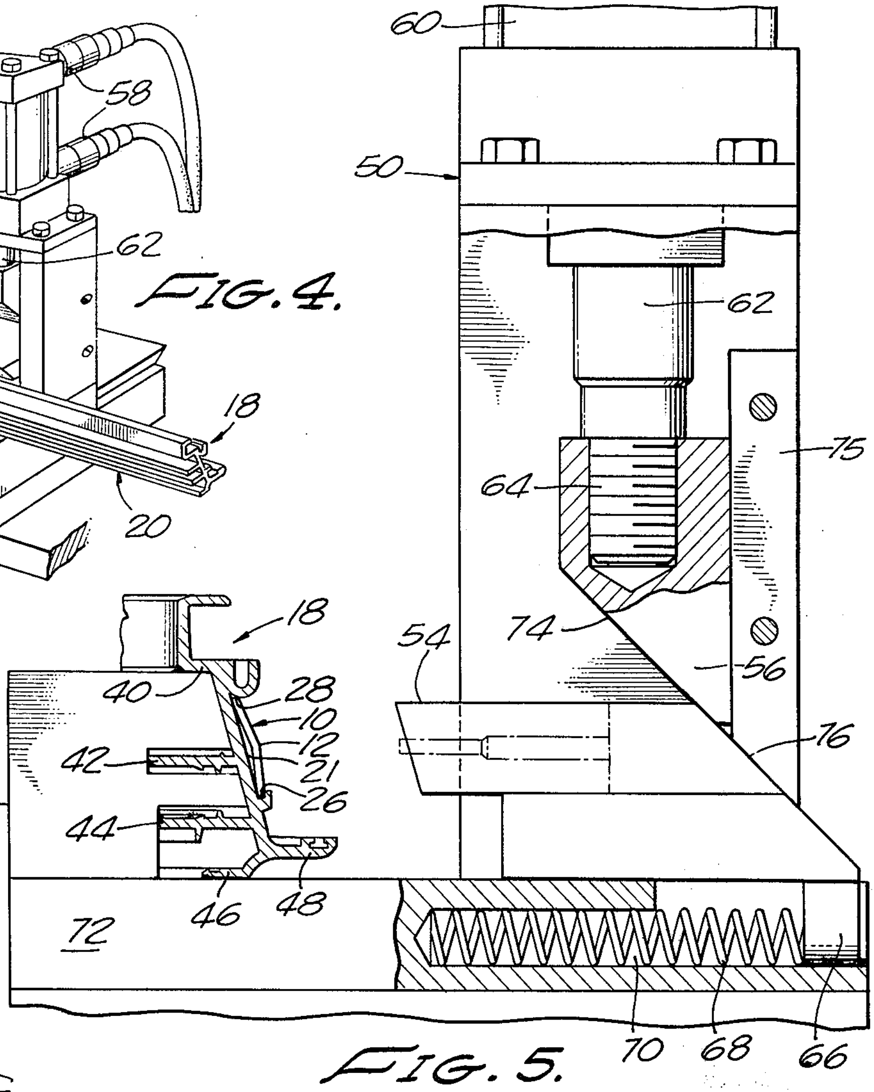
Figure 6:
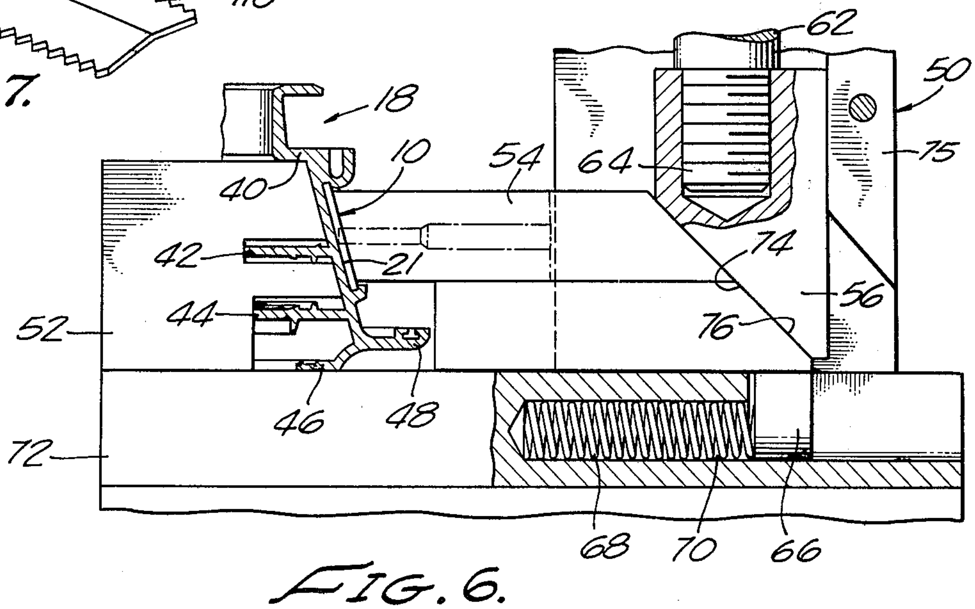

FIGS. 4–6 illustrate a hydraulic vise which may be used to perform the step of flattening the bent splice plate within the channels of the elongated sections to be joined.

The hydraulic vise is shown with a frame member in FIG. 4. FIG. 5 illustrates the relative position of hydraulic vise 50, frame 18, and splice plate 10 just prior to the compression of the splice plate. FIG. 6 is a similar view with the hydraulic vise 50 actuated and the splice plate flattened out within channel 21.

Hydraulic tubes 58 provide the means for increasing and reducing the liquid pressure in the hydraulic vise. Pressure chamber 60, to which the hydraulic tubes are connected, is pressurized to actuate the vise. Frame 18 is inserted between stationary jaw 52 and movable jaw 54 as indicated in FIG. 5. Stationary jaw 52 is shaped to receive flanges of frame 18 and to provide a suitable means for resisting the force applied against the frame by movable jaw 54. As indicated in FIG. 5, prior to application of the movable jaw to flatten the splice plate, the bent splice plate is inserted in the channel 21 of frame 18. Upon application of liquid pressure through hydraulic tube 58, the pressure in chamber 60 increases driving piston 62 down toward movable jaw 54. A cam 56 is attached to the threaded end 64 of piston 62. This cam has an inclined surface 74 which engages a corresponding inclined surface 76 of the movable jaw. Both inclined surfaces are lubricated.

The downward motion of piston 62 causes the inclined surface 74 of cam 56 to slide down against the corresponding inclined surface 76 thus causing movable jaw 54 to move to the left toward the stationary frame 18. Thrust plate 75, suitably mounted to the vise frame, constrains cam 56 to vertical movement. While the liquid pressure in pressure chamber 60 is maintained at a high level, piston 62 continues to move down thereby forcing movable jaw 54 to move closer to fixed jaw 52 until movable jaw 54 contacts splice plate 10 and compresses it into a flattened condition within channel 21 of frame 18.

As movable jaw 54 translates to the left, a shoe 66, attached to the movable jaw, compresses spring 68, which is positioned within chamber 70 of base 72. Shoe 66 is guided within chamber 70 which is also designed to provide a stop for shoe 66. The stop prevents damage to frame 18 by limiting the travel of movable jaw 54.

After the plate is flattened, the liquid pressure in chamber 60 is reduced through hydraulic tube 58. As a result, piston 62 and cam 56 are free to return to the upper portion of the hydraulic vise. A resetting force is provided by compressed spring 68 which, upon withdrawal of the liquid pressure in pressure chamber 60, is free to expand, pushing movable jaw 54 to the right against cam 56 thus resetting the machine to its open position.

Figure 7:
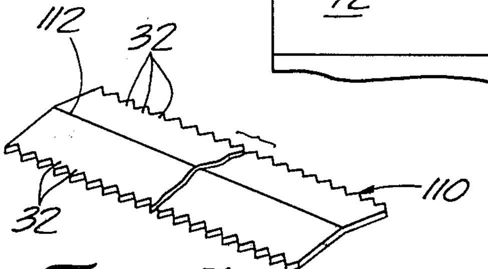

Various additional steps may be performed to increase the locking pressure engagement of the splice plate and the surfaces of the channel in which it is installed. For example, the width of the splice plate may be increased slightly to obtain a corresponding increase in the pressure engagement of the splice plate edges with the walls of the channel. FIG. 7 illustrates an additional technique for increasing the locking engagement of the splice plate and the frame sections. This technique comprises serrating the parallel elongated edges of the splice plate. By serrating the edges, the splice plate 110 is provided with triangularly-shaped teeth 32 which penetrate the walls of the channel creating a corresponding triangular indentation. The interaction of the angular walls of the teeth of the splice plate and the corresponding angular walls of the indentation made by those teeth, increase the locking effect of the splice plate within the channel. Splice plate 110 in FIG. 7, is indicated to be bent along longitudinal bend axis 112, for insertion in the channels of the sections to be spliced.

An additional technique for increasing the locking engagement of the splice plate within the channel is to provide one or more dimples in the flattened surface of the splice plate. Such dimples would displace and force splice plate material into corresponding dimples of the channel floor surface.

FIG. 8 shows splice plate 210 installed in the channel 21 and dimpled in the manner described above. FIG. 9 illustrates the manner in which dimple 34 causes displacement of a small area of splice plate 210 and a corresponding depression 36 of a portion of the surface of the channel floor so that the splice plate material penetrates the frame surface.

Dimple 34 may be made by hammering a punch into the surface of the splice plate or by providing the jaws of the machine, described in connection with FIGS. 4-6, with a built-in punch assembly to make the dimple concurrently with the flattening of the splice plate. Such a built-in punch assembly is indicated in FIGS. 5 and 6 by phantom lines.

Thus it is to be understood that what is described herein is a method for splicing together two abutting ends of a channeled elongated section aligned to form a single continuous channel, by providing a splice plate, which has been bent so that the distance between its elongated opposite edges is slightly less than the width of the channel, inserting the bent splice plate into the channel so that it overlaps the two abutting section ends, and then compressing the splice plate in the channel so that the distance between the opposite edges of the splice plate is slightly greater than the width of the channel thereby providing a means for rigidly attaching the respective ends of the sections to the splice plate and thus to one another.

It is to be understood further that the method of this invention may be carried out by expanding the plate within a channel to press it against surfaces of that channel by techniques other than that described, even though such techniques may not be as effective as the specific technique described herein.

It is to be understood further that additional steps may be taken to increase the locking engagement of the splice plate and the channel surfaces. An example involves punching one or more dimples or protrusions into the splice plate surface, which penetrate the surface of the channel.

While the invention has been illustrated as applied to the fabrication of frames for window assemblies, it will be apparent that it is applicable to a broad variety of purposes, including fabrication of frames for door assemblies and the like and more generally to the function of splicing together two or more sections of a channeled member for purposes of constructing structures and the like.

The foregoing description and the drawings are given merely to explain and illustrate the invention and the invention is not to be limited thereto except insofar as the appended claims are so limited since those skilled in the art who have this disclosure before them will be able to make modifications and variations therein without departing from the scope of the invention.

The invention claimed is:

1. A method of fabricating a frame adapted for receiving a closure means and adapted for installation in an aperture of a wall, comprising the steps of:

a. fabricating an elongated metal member having an exterior surface of elongated channel configuration at each end thereof,
   1. said fabricating step defining the channel at each end of said elongated member by the formation of a pair of spaced flanges which are integral with and upstanding from said exterior surface and which extend in parallel relation to one another in the direction of elongation of said metal member to provide the sides of said channel, the portion of said exterior surface between said flanges being formed to define a flat configuration which comprises the floor of said channel, and
   2. said fabricating step including the step of shaping the junctions between said flanges and said flat floor of said channel to define a pair of elongated grooves which extend along the opposite edges of said channel floor in facing relation to one another, b. bending said elongated member into a closed-loop configuration and to position the opposite ends of said member in abutment with one another thereby to form a circumambiently shaped frame which has a single butt joint therein extending across said frame in a direction transverse to the direction of elongation of said member,
   1. said bending step including the step of aligning the channels at the opposite ends of said member as well as their respective pairs of flanges and their respective flat floors and their respective elongated grooves to form a single, common-sided, flat-bottomed straight channel which extends across said butt joint, c. further fabricating an elongated rectangular metal plate having a width substantially equal to the width of the bottom of said common channel and having opposing elongated edges which are spaced from one another by a distance slightly less than the distance between the sides of said common channel,
   1. said further fabricating step including the step of shaping said elongated plate into a dihedral configuration wherein a pair of elongated rectangular planar plate sections are provided which are angularly inclined relative to one another about an elongated common bend axis located between and extending substantially parallel to the opposing elongated edges of said plate, d. inserting said plate into said common channel in overlapping relation to said butt joint with the common bend axis of said plate being oriented transverse to said butt joint,
   1. said inserting step including the step of positioning said plate so that its said common bend axis extends across said butt joint with substantially half the length of said plate being located on each side of said butt joint and so that the opposing elongated edges of said plate are disposed closely adjacent to and in comparatively loose engagement with said elongated grooves; and e. applying a force to the bend axis of said plate in a direction transverse to the floor of said common channel to flatten the portion of said plate overlying said butt joint toward said butt joint and to flatten the adjacent portions of said plate into surface engagement with the flatbottomed floor of said channel thereby to force said opposing edges of said plate further apart and to wedge said plate edges into outwardly directed tight locking engagement with the aligned elongated grooves on opposite sides of said butt joint, whereby said member ends are rigidly secured to one another through said plate to maintain the circumambient shape of said frame.

2. The method of claim 1 including the additional step of punching at least one protrusion into said plate, said force applying step being operative to cause said protrusion to penetrate into a corresponding indentation in said common channel when said dihedral-shaped plate is flattened.

3. The method of claim 1 wherein the difference between the width of said common channel and the distance between said opposing edges of said dihedral-shaped plate is within the range of 0.005 inches to 0.010 inches.

4. The method of claim 1 including the step of serrating said edges prior to the performance of step d.

* * * * *